April 18, 1961 J. VIELLE 2,980,908
METHODS AND APPARATUS FOR DATA EXCHANGE
Filed Oct. 15, 1957 9 Sheets-Sheet 6

INVENTOR:
JOHN VIELLE
by
Richardson, David and Nerdon
ATTYS.

FIG.11

United States Patent Office 2,980,908
Patented Apr. 18, 1961

2,980,908
METHODS AND APPARATUS FOR DATA EXCHANGE

John Vielle, Tangier, Morocco, assignor to Avel Corporation Geneva, Geneva, Switzerland Filed Oct. 15, 1957, Ser. No. 690,377

Claims priority, application Great Britain Oct. 24, 1956

34 Claims. (Cl. 343—112)

This invention concerns improvements in or relating to data exchange systems and more particularly refers to the exchange of data in collision prevention systems particularly for use with the action determining means in accordance with my co-pending patent application Serial No. 690,367 of even date herewith and vessel position indicator means in accordance with my co-pending patent application Serial No. 690,366 of even date herewith.

There is at the present time no universal and wholly reliable method of preventing collision between "moving vessels" which term should be understood to mean ships and aircraft and theoretically at the present time the only positive system is to provide a central control station which accurately plots and controls the movement of all vessels within a given area. Such a theoretical system is extraordinarily complex and relies, in the final event, on the decisions of one man. It is our belief, after careful consideration of the poblems, that it is preferable to make use of a co-operative system for the prevention of collisions in which the two vessels exchange a sufficient amount of information about their present and intended courses of action as to enable the vessels to take mutual avoiding action in accordance with pre-determined rules. This invention, therefore, which can be considered as part of an overall system, is primarily concerned with methods and apparatus for the co-operative exchange of data.

The data to be exchanged between two vessels will depend upon certain factors, the chief of these being the precise system for the avoidance of collisions and secondly whether the vessels are in point of fact ships or aircraft. The primary difference between ships and aircraft is clearly that aircraft operate at different heights and, therefore, two aircraft vertically above one another (when flying on straight and level courses) are not in danger of collision whereas the same situation is impossible with surface ships. On the other hand, submarines are capable of manoeuvring in a vertical plane to a limited extent and may, therefore, be treated as aircraft for the purpose of this invention.

It should be understood that ground obstructions may be considered, from an effective point of view, as stationary vessels which are incapable of manoeuvring and where applicable, this invention must be considered as embracing the exchange of data between moving vessels and stationary obstructions, ground control or shore installations and the like.

Taking the particular case of aircraft, it will be clear that one of the primary parameters for the avoidance of collision and hence in the data exchange must be the height of the aircraft. On the other hand, for both ships and aircraft the other important parameters for the avoidance of collision are the course and speed of the vessel. Finally the mutual parameter, which must be determined jointly between the two vessels, of the relative bearing of one vessel from the other is most important.

It is, therefore, an object of the present invention to provide co-operative data exchange methods and apparatus suitable for the purpose of avoiding collision.

According to this invention there is provided a co-operative method of exchanging data comprising generating a radio frequency carrier; modulating such carrier frequency with a modulating frequency characteristic of a first data item; pulse modulating such modulating frequency by pulses of a length characteristic of a second data item and transmitting such pulsing modulated carrier in an interrupted manner, the interval between transmissions being independent of the length of a pulse transmitted during a transmission; and receiving, demodulating and decoding such transmission.

According to a further aspect of this invention, there is provided apparatus for the co-operative exchange of data comprising radio frequency carrier generating means; means for generating a modulating frequency characteristic of a first data item and for modulating such carrier frequency by said modulating frequency; means for interrupting said modulating frequency by pulses of a length characteristic of a second data item and for passing such pulsing modulated carrier frequency to a transmitter; and means for interrupting the carrier frequency transmitted by such transmitter at a rate such that the transmission and rest periods are not directly related to the pulse length; and a receiver adapted to demodulate the received signals and pass the modulating frequency to means adapted to determine the value of the modulating frequency and to pass the received signals, before or after demodulation, to a second comparator to determine the pulse length of the received signals.

The modulation frequency may, in theory, be any frequency but in practice may be either an audio frequency or a radio frequency. An "audio" frequency may be defined, for the sake of convenience, as any frequency below 10 kc./s. and, therefore, including frequencies generally known as "sub-sonic," whilst "radio" frequencies may be defined as any frequency above 10 kc./s.; normally the radio frequency will be substantially less than the carrier frequency and we believe that for operation on short and medium wave band carrier frequencies, it will be desirable to use a radio frequency below 500 kc./s. The carrier frequency may be any frequency desired, the choice being chiefly dependent upon international frequency allocations.

The statement that the interval between transmissions is independent of the pulse length means that the pulse repetition frequency associated with one vessel does not necessarily depend upon the second data item of that vessel.

In co-operative systems for the exchange of information, it is vitally important that the data to be exchanged should be measured relative to a datum which is common to both of the measuring devices provided in the two exchanging stations but on the other hand it is not at all important thatt he data should be specifically related to some absolute value. Thus in the specific instance where height is being exchanged between two aircraft, we do not regard it as important to measure this height in feet or other units of similar character relative to some absolute datum such as mean sea level, provided that two aircraft in the same vicinity are using some other common datum. We, therefore, prefer to make use of the ambient barometric pressure as a measure of height, making only those corrections which are dependent upon the nature of the aircraft carrying the equipment and not making those corrections which are dependent upon errors common to all aircraft in the same vicinity. Thus more specifically, the barometric pressure should be compensated for "static head error," for this is characteristic of the aircraft and its angle of flying and similar factors, but the pressure does not require compensation for the external ambient temperature of the aircraft, since this source of error is common to two aircraft in the same vicinity and at the same height. It will now be clear, therefore, that a standard pressure measuring device, e.g. a capsule, having a known calibrated response may be used to determine the factor referred to in this specification as "height."

It is contemplated that all vessels in a specific area may be transmitting continuously the various items of information required in accordance with the overall system and, therefore, it is possible, since all these vessels will be transmitting on the same fixed radio frequency, that there may be some mutual interference between either the carriers (which cannot conveniently be controlled to an absolute accuracy of greater than say 1 in 10 million) or between the modulating frequencies which are characteristic of the first data item as previously explained. It may, therefore, be preferable to arrange that aircraft continuously transmit only limited data such as height and that this is used as a trigger control to arrange for the full exchange of information on the reception of such a signal by another aircraft at the same height. Similarly, such a system may be extended by arranging for a responder mechanism to return a signal initiated by a transponder unit, such signal being characteristic of height, and it being arranged that the transponder will, on the reception of a signal indicating that a second aircraft is at the same height, calculate the time taken for the response and so trigger the common exchange of information if, and only if, the two aircraft are at the same approximate height and within a predetermined distance of one another.

The present invention, as can be clearly understood, is a co-operative system and, therefore, in the following detailed description it is arranged that each figure, where applicable, shows a transmitter and a receiver. Similarly, for the sake of simplicity the vessel having the receiver is assumed to be fully equipped, whilst the vessel having the transmitter is assumed to have only those parts which are necessary to fit in with the co-operative system. Clearly it is desirable that both vessels will be fully equipped although it will be understood from this following description that this is not absolutely necessary.

In order that this invention may more readily be understood two embodiments of the same as particularly applied to aircraft and two embodiments as particularly applied to ships will now be described by way of example with reference to the accompanying drawings, in which.

Figure 1:
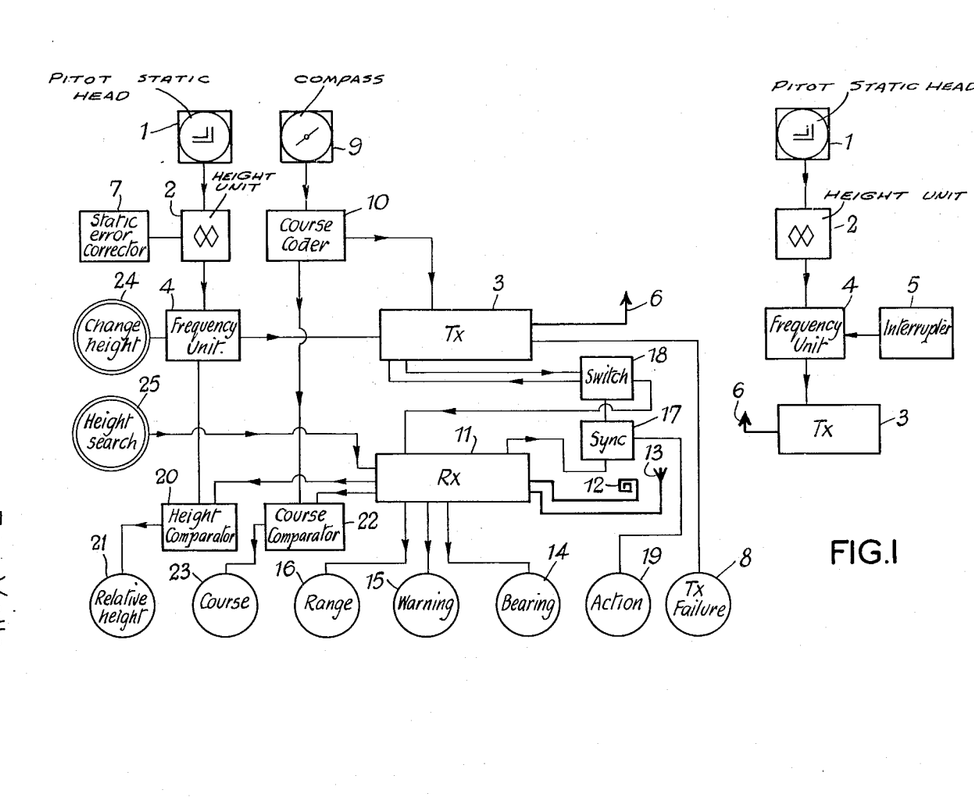
Figure 1 is a diagrammatic representation of one embodiment of the equipment for an aircraft.

Referring now to the accompanying darwings and in particular to Figure 1 in which the modulation frequency is a radio frequency, it will be seen that in accordance with the above described convention the right-hand portion of the figure shows the basic transmission apparatus whilst the left-hand portion shows the apparatus of a fully equipped aircraft. The various components of the apparatus are all illustrated diagrammatically since the precise details depend upon many factors such as, for example, allocated frequencies and are moreover within the scope of the skilled tenchician in the art of radio communication.

Referring firstly to the right-hand portion of Figure 1, it will be seen that the basic transmission apparatus comprises a static head 1 which is arranged to receive the ambient pressure at the aircraft in the known manner and the signal from this static head is conveyed to a height unit 2 wherein the static pressure is used to deform a standard pressure sensitive device, such as a capsule (shown diagrammatically), and the degree of deformation is used to vary the radio frequency of a transmitter 3. The actual apparatus for varying the frequency of the transmitter 3 is hereinafter referred to as "frequency unit" and is shown at 4. The frequency unit 4 is keyed by an interrupter 5, which for reasons which will be apparent hereinafter desirably operates in a random or specially selected manner. Finally the signals from the transmitter 3 are passed to a transmitting aerial 6.

In the full apparatus the parts previously described are, of course, provided with the exception that the interrupter 5 is not present. In aidtion in the full apparatus, an error correcting device 7 controls the height unit 2 in order to compensate for static error. The signal from the frequency unit 4 is passed to the transmitter 3 and the output from the transmitter 3 is used to operate a relay or other device, not shown, so that on transmitter failure a warning light 8 will be illuminated in the pilot's instrument panel. In addition, the actual course of the aircraft as derived from a compass or gyro repeater 9 is applied to a course coder 10 which has the function of keying the transmission in a manner which is dependent upon the actual course of the aircraft, the pulse length being dependent upon course whilst pulse repetition frequency is variable as hereinafter described. The term "pulse length" as used herein should be understood to include the spacing between two "mark" pulses, e.g. pulses of brief duration marking the beginning and end of the significant pulse length.

In addition to the transmitter described above, the complete equipment includes a receiver 11 which is provided with directional and omni-directional aerials 12 and 13 in known manner so that it is possible for the pilot to discover the bearing of incoming transmissions. Very desirably this is effected automatically and the resultant bearing of an incoming transmission is displayed upon a bearing dial 14.

In addition the mere fact that a transmission is received is indicated to the pilot by the illumination of a warning light 15. The illumination of this warning light is significant for since the present embodiment operates using a variable radio frequency modulation of the carrier it follows that if a transmission is received by the receiver 11, another adjacent aircraft must be at the same approximate height and this is a dangerous situation for aircraft. The approximate range of the aircraft is, in this embodiment, shown on a range meter 16, the range being determined solely by the apparent strength of the received signals.

In addition the receiver 11 is controlled by a synchroniser 17 and a switch 18 which together function to interrupt the receiver 11 during operation of the transmitter 3 and to bring the receiver 11 into synchronism with the pulse repetition frequency of an incoming aircraft. Should it be found that it is not possible to bring the receiver into synchronism or if the synchronised frequency is "special" then it will be known, as explained hereinafter, that avoiding action must be taken by the aircraft which contains the full equipment. In consequence, the synchroniser 17 is arranged to operate an action warning light 19 under these circumstances.

The output from the receiver 11 is an audio frequency note interrupted by pulses of a length which depends upon the course of the transmitting aircraft and the audio note is passed to a height comparator 20 together with the signals from the frequency unit 4 so that the relative height of the other aircraft may be presented on a relative height meter 21. Similarly, the interrupted signals defining course are passed to a course comparator 22 so as to present on a suitable meter 23 the relative course of the other aircraft (as further explained with reference to Figure 5).

In addition, should the pilot decide to change height then he may apply a varying saw-tooth bias to the frequency unit 4 by means of a change height device 24. Finally, if the pilot has decided that in addition to changing height, or independently thereof, he is interested to discover whether any aircraft are at heights other than his own, he may operate a height search unit 25 which controls the receiver 11 so as to receive the transmissions characteristic of a height other than his own.

Thus to sum up it will be seen that the pilot has under his control a change height device 24 and a height search unit 25. Information is automatically derived from the pitot static head 1 and the compass 9 together with the aerials 12 and 13. The information is presented to the pilot to show him that another aircraft is at the same height by the warning light 15 and he is also informed of the approximate range of the other aircraft by the range meter 16 and its bearing by the bearing dial 14. Moreover, the pilot is advised of the relative height of the other aircraft on the height meter 21 and its course on the meter 23. Finally, the pilot is warned if he must take the avoiding action or if his own transmitter fails.

Certain minor details of the equipment differ when it is applied to a ground station. Thus in the case of equipment for airfield control or a control zone, which may be used to operate the apparatus described in detail in my co-pending application Serial No. 690,366 of even date herewith, there will only be required the parts associated with the receiver 11 so that the controller can be aware of the heights and courses of aircraft in the zone. The parts associated with the transmitter 3 will not be required unless the controller wishes to transmit the zone height or similar data to an aircraft.

If the equipment is associated with a ground beacon for showing the height of an obstruction or the minimum height in a flight zone or the like, only the parts associated with the transmitter 3 will be required. However the pulse repetition frequency will desirably be "special" to show that it is a ground beacon. Moreover since the height unit 2 may not be at the height to be signalled, an off-setting device may be provided. In the case of beacons designed to show obstructions, the frequency unit 4 will preferably be arranged to emit all the frequencies corresponding to the dangerous heights. This may be done by applying a saw-tooth bias.

Now having described the apparatus in general terms certain portions of the same will be described in more detail.

Figure 2:
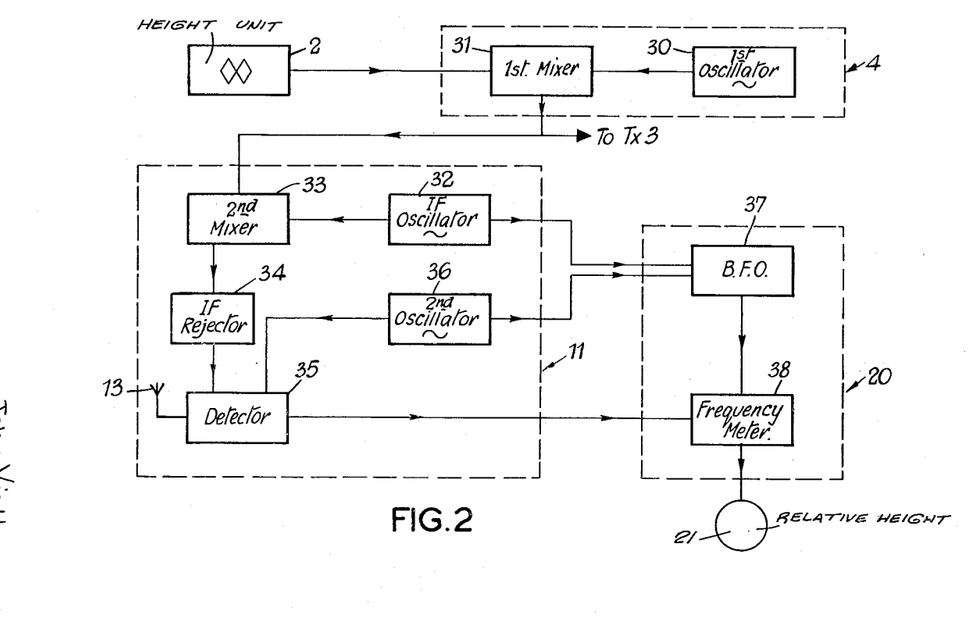
Figure 2 shows details of a frequency unit and comparator shown in Figure 1.

Referring now to Figure 2, there are shown in more detail certain parts of the frequency unit 4, the height comparator 20 and the receiver 11.

In this embodiment of the invention the frequency unit 4 receives signals from the height unit 2, the height unit 2 being arranged to generate signals in the band ranging between say 60 to 100 kilocycles. Thus as, in a suitable arrangement, these aircraft heights may range between sea level and 40,000 feet, one cycle equals one foot. The frequency unit 4 includes a crystal-controlled first oscillator 30 operating on a fixed frequency which is 60 kilocycles below the nominal radio carrier frequency of the transmitter which is desirably in the medium frequency band and this oscillator frequency is mixed with the frequency derived from the height unit 2 in a first mixer 31. The output from the first mixer 31 clearly, therefore, occupies the 40 kilocycle band immediately above the nominal radio frequency, the lower side-band being suppressed, and this output is used to control the transmitter 3.

The receiver 11 includes a crystal-controlled intermediate frequency oscillator 32 and the signals from this oscillator are passed to a second mixer 33 together with the signals from the first mixer 31 so as to provide an output which is the transmitter frequency plus the intermediate frequency and after passing through an intermediate frequency rejector 34 the signals are passed to a detector 35, this detector having a band width of only 1 kilocycle. The signals from the aerial 13 are also passed to the detector 35 together with the output from a second crystal-controlled oscillator 36 operating at 500 cycles below the intermediate frequency oscillator 32, the detector 35 acting as a complex mixer. An audio output is derived from the detector 35 which depends upon the difference in height between the two aircraft and varies between 0 and 1 kilocycle.

One convenient form of frequency comparator 20 is that shown in Figure 2 and comprises a beat frequency oscillator 37 which operates at 500 c./s. and is actually controlled by the intermediate frequency oscillator 32 and the second oscillator 36 so as to provide an accurate beat frequency standard which is self-compensating for errors in the oscillators 32 and 36, and the output from this beat frequency oscillator 37 is fed to a differential frequency meter 38 together with the audio output from the detector 35, the result being presented on the centre zero relative height meter 21.

Figure 3:
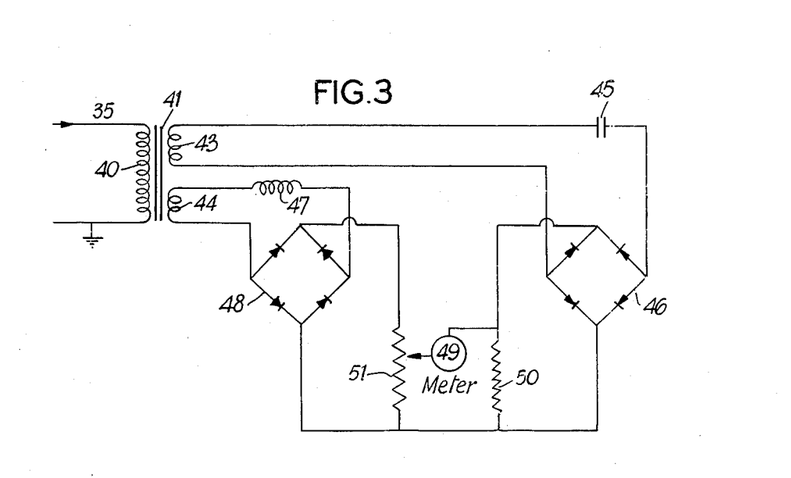
Figure 3 shows details of an alternative to a portion of Figure 2.

If desired, the frequency comparator 20 shown in Figure 2 may be replaced by, for example, that shown in Figure 3.

In the apparatus shown in Figure 3 the output from the detector 35 of Figure 2 is fed to the primary 40 of a transformer 41 which has two secondaries 43 and 44. The output from the secondary 43 is passed through a condenser 45 to a bridge rectifier 46 and the output from the secondary 44 is passed via an inductance 47 to a bridge rectifier 48. The output from the bridge rectifier 46 is passed to a polarised relay or centre zero meter 49 forming the relative height meter 21 of Figure 1 and is by-passed by a resistor 50. A potentiometer 51 is connected across the output from the rectifier 48 and has its slider connected to the meter 49 for zero setting purposes, the lower ends of the resistor 50 and potentiometer 51 being connected.

The whole circuit, being frequency sensitive and depending upon the zero setting of the slider of the potentiometer 51, can be used to determine the relative height characteristic of an incoming transmission.

Figure 4:
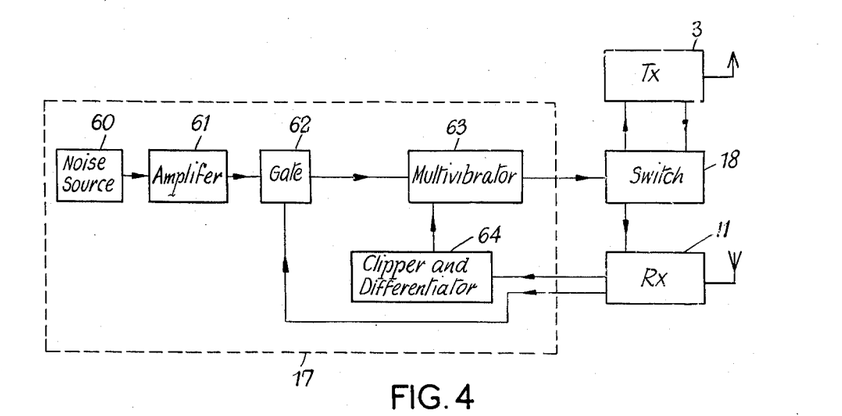
Figure 4 shows details of a synchroniser and switch shown in Figure 1.

Figure 4 shows in more detail the components associated with the synchroniser 17 of Figure 1. Thus an ultra low frequency noise source 60, which may be a carbon granule capsule, is connected to an ultra low frequency amplifier 61 incorporating a low pass filter to form a random frequency generator and the output from the amplifier 61 passes through a gate 62 to control the switching of a free running multivibrator 63, the output of which operated the bi-stable switch 18. Thus under normal operating conditions the multivibrator 63 operates the switch 18 to switch on the transmitter 3 for the length of time determined by the course coder 10 and at the end of the course pulse, the transmitter operates the switch 18 to switch on the receiver 11 whereafter a further pulse from the multivibrator 63 begins the cycle again.

However, when a signal is received by the receiver 11 this is passed by the automatic volume control line to the gate 62 to close the gate and thus stop the operation of the multivibrator 63. The incoming pulses from the receiver 11 are also passed to a clipper and differentiator 64 to operate the multivibrator 63. The end of a received signal, therefore, forming a negative-going pulse, operates the multivibrator and switch 18 so as to start the transmitter 3 and as soon as the transmission stops, the switch 18 is again operated as before to begin reception. The two synchronisers 17 will, therefore, pull the two transmitters into synchronism.

It will be clear that when synchronism has been achieved, the two transmitters operate alternately, each starting as soon as the other has been switched off. Hence a third aircraft coming into the vicinity cannot come into synchronism and, as explained with reference to Figure 1, the action warning light 19 will be illuminated to show the pilot that he must take the avoiding action. Similarly if the received transmissions originate from an aircraft having an interruptor 5 or having a "special" pulse repetition frequency, in general signals will not be received as soon as the receiver is switched on and synchronism may be impossible. In any event, the action warning light 19 is illuminated.

If desired the speed of the aircraft may also be presented, if this information is considered to be of assistance. Thus as described in detail hereinafter with reference to Figure 5, the pulse length is characteristic of course but the pulse repetition frequency is locally determined by the synchroniser 17. If, therefore, it is desired to present speed in addition to course a double pulse may be used, the first pulse length being characteristic of course whilst the second pulse or overall length is characteristic of speed. Clearly the reverse arrangement may be used. The two pulses are separated by a very brief delay. In order that the multivibrator 63 should not be affected by the interval between the two pulses, the pulses received from the receiver 11 may be passed through a low pass filter so as to obtain, in effect, a single long pulse which is passed to the clipper and differentiator 64, and this arrangement is particularly convenient if the overall length of the two pulses is characteristic of speed. Alternatively, this low pass filter may be omitted and the multivibrator may be arranged to be switched by every other pulse from the clipper and differentiator 64. The speed transmitted may be either indicated or true air speed or speed cos $x$ (where $x$ is the angle of climb).

In order to be received within the band width of the normal radio compass type equipment the repetition frequency as arranged by the multivibrator 63 must be low compared to the compass modulation frequency and it seems desirable that the transmitting period should be sufficient to allow a fix in one transmission period. Thus it appears desirable that the pulse repetition frequency should be of the order of 0.1 cycle per second.

Figure 5:
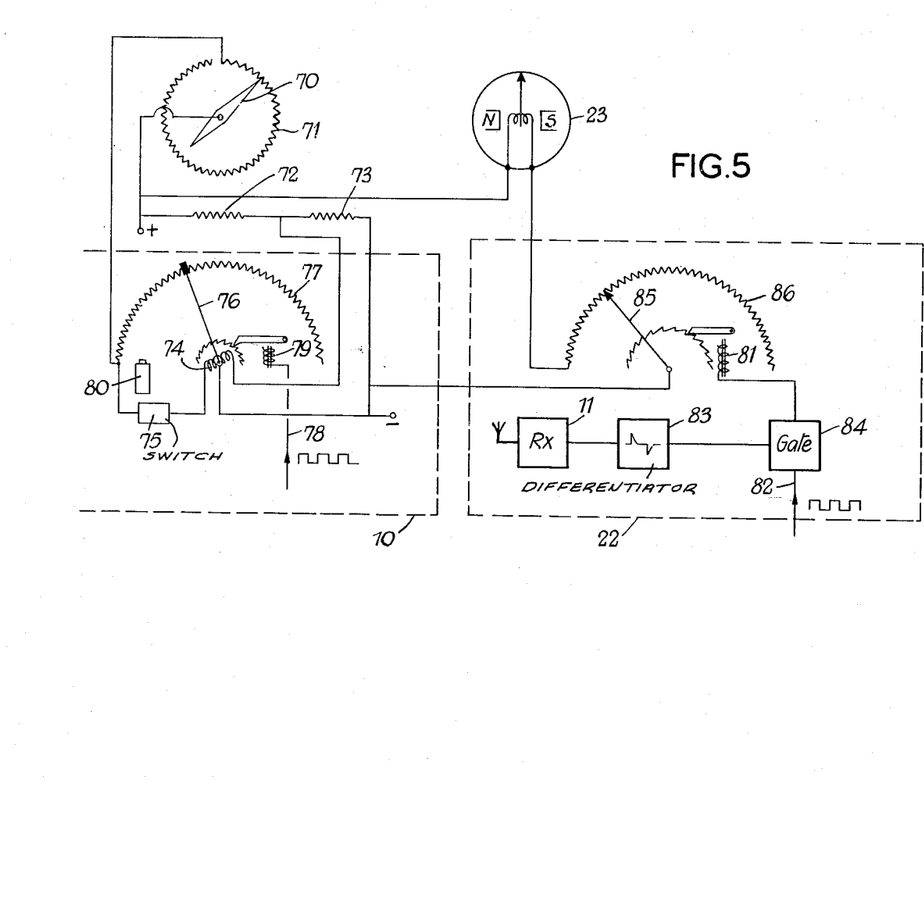
Figure 5 shows details of a course coder and comparator shown in Figure 1.

Figure 5 illustrates the course coder 10 and course comparator 22. Thus as shown in Figure 5, a compass needle 70 having a wiper contact at one end and forming part of the compass or gyro repeater 9 sweeps over a standard resistance 71 and the needle 70 is connected to a positive source of electrical energy so that the output between the end of the resistance 71 and the needle 70 is dependent upon the course that the aircraft is taking. The voltage derived in this manner is passed via a bridge network including two standard resistances 72 and 73 to the operating coil 74 of a device having the combined functions of a uni-selector and volt-meter forming the course coder 10. The flow of current to the coil 74 is controlled by a switch 75 so that the connection is only made when the synchroniser 17 has connected the receiver 11 into circuit. Thus during the reception period the pointer 76 of the coder 10 is moved over a second standard resistance 77 so as to take up an angular position dependent upon the course.

During the transmission period, the switch 75 is opened and a train of standard pulses of short duration is fed by a lead 78 to the operating coil 79 of the uni-selector so as to step the pointer 76 back to zero in which position a limit switch 80 controlling the transmission is closed. Clearly the time taken for the pointer to travel from its position back to zero will depend upon the angular position and hence if the pulses appearing on lead 78 start when the transmitter is started and the transmitter is stopped by the switch 80, the time of transmission will depend upon the course and hence the pulse length will depend upon course also.

The course comparator 22 is also illustrated in Figure 5 in detail and comprises a uni-selector having an operating coil 81 which is controlled by the same standard pulses, appearing now on lead 82. The output from the receiver 11 passes through a differentiator 83 to give rise to positive-going and negative-going pulses marking respectively the beginning and end of the main pulse and these positive- and negative-going pulses respectively open and close a gate 84 interposed between the lead 82 and the operating coil 81. Thus the angular position of the pointer 85 of the uni-selector associated with the course comparator is determined by the length of the received pulses and hence the angular position of this pointer gives an indication of the actual course of the aircraft being received. Zeroising means (not shown) come into operation during transmission periods.

The course comparator 22, therefore, shows by the position of the pointer 85, the course of the other aircraft but in order to provide for the determination of the relative heading of the other aircraft for presentation, e.g. on the meter 23, the pointer 85 may be arranged to sweep a standard resistance 86 similar to the resistance 71 and the output taken from the pointer 85 together with the output taken from the compass needle 70 may be fed to a centre zero type milliammeter forming the meter 23 to present relative heading as desired.

Similar apparatus may be used to show speed.

The embodiment illustrated in Figure 5 is clearly not the only possible apparatus for encoding and decoding, but in general apparatus capable of being moved or set to a position or value dependent on course and of being returned to a basic position or value at a predetermined rate can be used to measure the length of the pulses.

Figure 6:
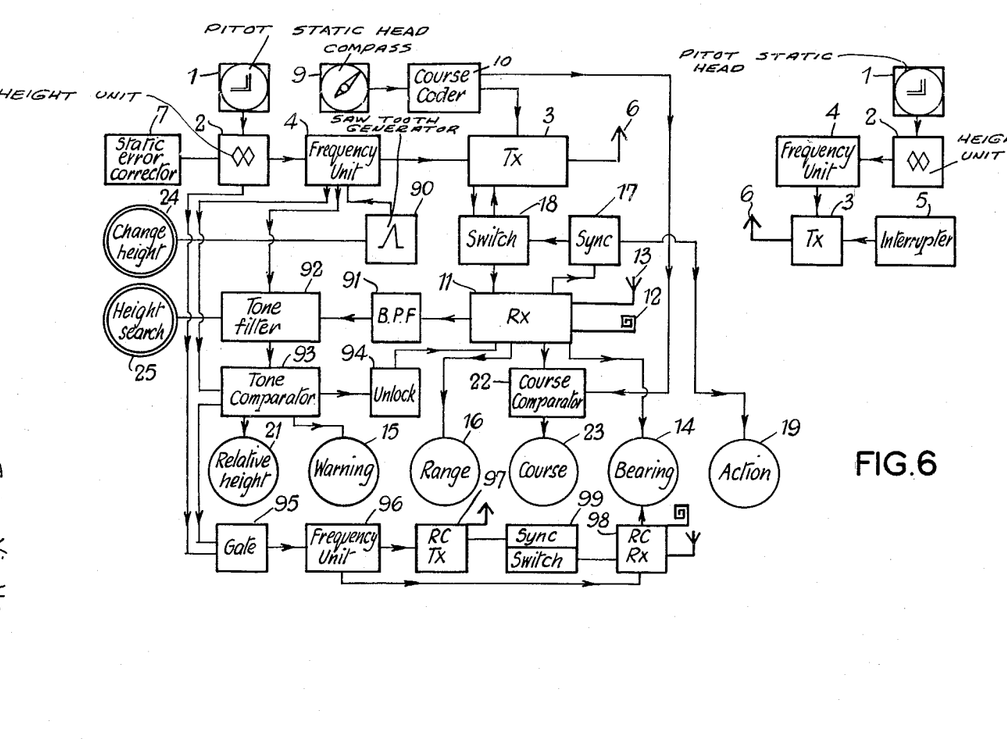
Figure 6 is a diagrammatic representation of a second embodiment of the equipment for an aircraft.

The embodiment shown in Figure 6 is also specifically designed for use in aircraft but uses an audio frequency modulation, both side bands being transmitted. Where possible the parts have been given the same reference numerals as in Figure 1.

Thus the pressure at the static head 1 is conveyed to the height unit 2. The degree of deformation of the pressure capsule is used to vary the audio frequency of the frequency unit 4, the output of which is fed to modulate the radio frequency of the transmitter 3 operating on a fixed radio frequency and having an aerial 6. The radio frequency output from the transmitter 3 is interrupted by an interrupter 5. The signal from the frequency unit 4 fed to the transmitter 3 is controlled by a saw tooth generator 90 which is in turn controlled by the change height control 24, so as to cause the audio note to vary between that characteristic of the actual height of the aircraft as set by the height unit 2 and that characteristic of the intended height of the aircraft as set on the control 24 if this differs from the actual height. The saw tooth may be linear in form or may be non-linear in order to provide for increased warning either at the intended height or adjacent to the actual height.

The parts associated with the compass 9, course coder 10, course comparator 22 and synchroniser 17 are substantially as previously described.

The demodulated signals from the receiver 11 are passed through a band-pass filter 91 which has the function of removing, firstly, frequencies below about, say 100 c./s. which are caused by beating between two of the crystal-control transmitters 3 and also removing high audio frequencies above those which are characteristic of height. In a convenient arrangement the audio frequency range may be from 1 to 5 kc./s. to cover up to 40,000 feet, e.g. so as to give 1 cycle per 10 feet. Alternatively the audio frequency range may be only one octave, e.g. 1.7 to 3.4 kc./s., for such an arrangement has certain advantages.

The signals leaving the band-pass filter 91 are now passed to a tone filter 92 which is also fed with the audio note from the frequency unit 4 so that received signals which are very different from that characteristic of the height at which the aircraft is flying are automatically rejected. This tone filter 92 may be controlled by the manual search control 25 so as to displace its effective pass-band in order to enable the pilot to search at heights other than that at which he is flying. The output from the tone filter 92 now goes to a tone comparator 93 together with the audio note from the frequency unit 4 and the exact difference between these two notes is determined and displayed upon the relative height meter 21 to show the relative height of the other aircraft. Moreover, the mere fact that a signal passes through the tone comparator 93 is sufficient to activate the warning light 15.

The receiver 11 is provided with directional and omni-directional aerials in order that it may automatically lock on to a received signal in order to give the bearing of this signal, but since it is possible that the receiver 11 will lock on to a transmission which is coming from an aircraft at a totally different height, an un-locking device 94 is provided so as to prevent the receiver locking unless there is an output from the tone comparator 93 showing that an aircraft is in the same approximate height band.

Since all aircraft are transmitting upon the same radio frequency and the receiver 11 is required to lock on to one of these transmissions in order to provide the bearing, some difficulty may be incurred in some circumstances and, therefore, it appears desirable, in a fully equipped aircraft, to provide an additional transmitter and receiver of the radio compass variety in order to provide solely information regarding the actual bearing of the transmitting aircraft. Thus the output from the tone comparator 93 is, when an aircraft is detected at the same approximate height, passed to a gate 95 together with the signals from the height unit 2 and the signals from the height unit 2 pass through the gate 95 under these circumstances to a frequency unit 96 in order to vary the radio frequency generated in this frequency unit in the manner described with reference to Figure 1, the basic radio frequency being different to that of the transmitter 3. This varied radio frequency is passed to a radio compass transmitter 97 and also passed to a radio compass receiver 98, the transmitter 97 and receiver 98 being inter-connected by a synchronising switch 99. Thus if another aircraft is detected at the same height the radio compass transmitter 97 and receiver 98 are activated and the receiver 98 provides an accurate bearing of the other aircraft, passing this to the bearing meter 14 and since the radio compass works on a variable radio frequency characteristic of height no other aircraft are received to cause interference. The parts 96, 97, 98 and 99 are conveniently identical to those described with reference to Figures 1, 2, 3 and 4.

Figure 7:
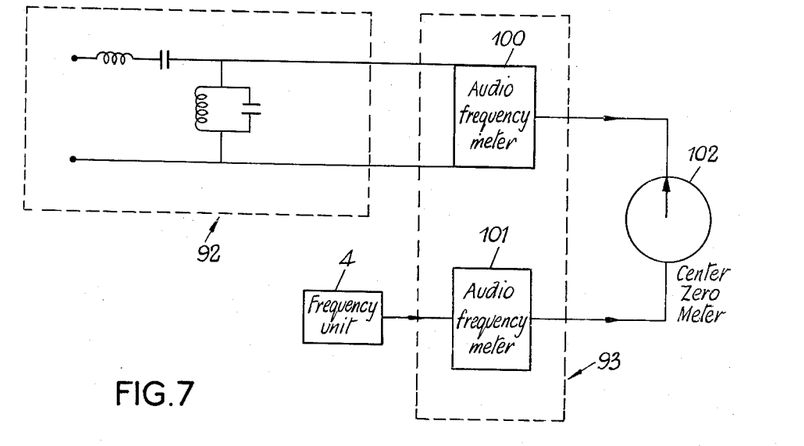
Figure 7 shows details of a frequency filter and comparator shown in Figure 6.

Figure 7 illustrates in some detail the tone filter 92 and tone comparator 93. The tone filter 92 comprises, as may be seen, a standard capacity-inductance type audio filter which is arranged to be of the band-pass variety having a single octave range, in this particular embodiment, of 1.7 kc./s. to 3.4 kc./s. In this way all unwanted audio tones are rejected and if desired the tone filter 92 may be made of even narrower acceptance so as to be of the sharply peaked variety and may have one or more of its components adjustable by the manual height search control 25 so that only those audio notes corresponding to aircraft within the same approximate height band are received. The output from the tone filter 92 is fed to a standard audio frequency meter 100 to provide an output which is a measure of the height of the other aircraft and the output from the frequency unit 4 is also passed to an identical standard audio frequency meter 101, the output from these two audio meters being fed in opposition to a centre zero meter 102 forming the relative height gauge 21. The meters 100 and 101 may be type 1176–A manufactured by General Radio Company, Cambridge 39, Massachusetts.

Figure 8:
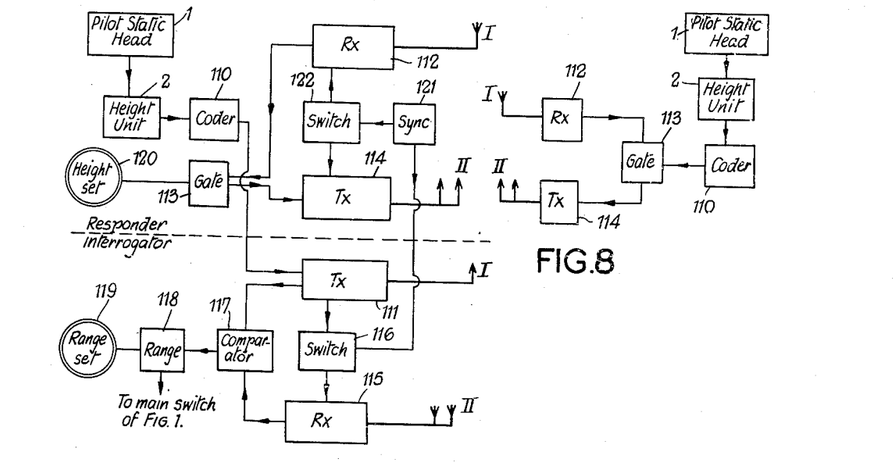
Figure 8 shows transponder ranging and switching apparatus.

In addition to the above described apparatus, the installation may include apparatus for determining the distance between the two aircraft and such apparatus is illustrated in Figure 8. Referring now to Figure 8, use is made of transponder techniques for determining the distance between the two aircraft and in accordance with the usual convention, the left-hand portion of the figure illustrates the full equipment whilst the right-hand portion illustrates the absolute minimum equipment. As is usual in transponder techniques the equipment may be divided into an interrogator portion and a responder portion and both of these are controlled in this embodiment by the height unit 2 which is arranged to provide, by means of a coder 110, pulses which have a pulse length, are at a pulse repetition frequency or which have a modulation, e.g. audio modulation, frequency that is characteristic of the height of the aircraft as determined by the height unit 2. These pulses from the coder 110 pass to an interrogator transmitter 111 operating on a frequency I desirably in the U.H.F. or V.H.F. bands. The right-hand portion of Figure 8 shows a responder receiver 112 also operating on the frequency I and a gate 113 controlled by the coder 110 so that if, and only if, the received transmissions are characteristic of the height at which the aircraft carrying the responder unit is flying will an associated responder transmitter 114 operating on a frequency II, conveniently in the same band as frequency I, be activated to send out a reply to the interrogation. The fact that the gate 113 has been opened may be signalled to the pilot to indicate that another aircraft is at the same approximate height.

The fully equipped aircraft is also provided with an interrogator receiver 115 operating on frequency II, the transmitter 111 and receiver 115 being suitably coupled by a switch 116 and having their outputs connected to a phase difference computer 117 which will determine the effective time which has elapsed between the interrogation and the response, suitable allowance being made for the known delay in the apparatus. This time delay is characteristic of the separation between the two aircraft and is passed to a range determinator 118 controlled by a range setter 119. Hence, signals emanating from the range detector 118 show that there is another aircraft at the same height and within a certain preset range. The apparatus shown in Figure 1 may now be automatically switched on to transmit and obtain all the further information that the pilot requires.

In addition, the responder unit in a fully equipped aircraft incorporates a height setting device 120 for the gate 113 so as to enable the pilot to search at heights other than that at which he is flying and in addition a synchroniser 121 and switch 122 are provided linking the two transmitters 111 and 114 so as to prevent transmissions from the transmitter 111 being received by the receiver 112 and transmissions from the transmitter 114 being received by the receiver 115 all in one aircraft.

It will be clear that in the case of very fast aircraft it will be necessary to take the avoiding action when the two aircraft are further away than in the case of relatively slow aircraft and, therefore, the range measuring device 118 may make allowance for the speed of the aircraft carrying the interrogator. However, allowance must still be made for the speed of the aircraft carrying the responder and in order to provide for this it may be desirable to vary the time delay between the receiver 112 and the transmitter 114 to make allowance for the speed of the aircraft. Quite clearly slow aircraft will have a long delay whereas fast aircraft will have a very short delay so as to appear closer than they, in point of fact, are.

This feature is only of importance when the two aircraft are approaching head-on and it may, therefore, be desirable to provide a pair of responder receiver aerials, one being shielded so as to accept only those signals coming from in front of the aircraft, whilst the other only receives those coming from the rear of the aircraft and the variable time delay may only be applied to signals received by the aerial at the front of the aircraft. In the case where the interrogation comes from a ground station, as more particularly described in my co-pending Application Serial No. 690,366 of even date herewith, it will preferably be arranged that the standard time delay is used and to this end a further aerial under the control of the pilot may be switched into circuit, or alternatively, the shorter time delay associated with the aerial facing forwards may be cut out under the control of the pilot.

Figure 9:
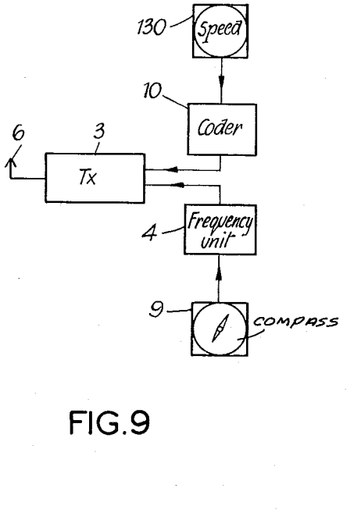
Figure 9 is a diagrammatic representation of an embodiment similar to Figure 1 but suitable for ships.

Figure 9 illustrates this invention as applied more particularly to ships. Clearly there is no value, in the case of ships, of transmitting height but instead the speed of the ship is transmitted. Moreover, for reasons which will be apparent, the course of the ship is used to control the frequency of the transmission whilst the speed of the ship is used to control the pulse length. In Figure 9 the parts have been given (where practicable) the same reference numerals as are used in Figure 1.

Thus the compass 9 controls the frequency unit 4 which has its output passed to the transmitter 3 and a speed sensing unit 130 controls the speed coder 10 which also has its output passed to the transmitter 3.

As before, the receiver 11 has a directional aerial 12 and an omni-directional aerial 13, but the directional aerial 12 may be controlled by a manual scan control 131. The bearing of an incoming transmission is displayed upon the bearing meter 14.

The operation of the receiver 11 is controlled, as regards frequency, by a search unit 132 operating in a random manner and which is normally set by means of an auto-control 133 to sweep regularly through the relevant radio frequencies and in addition the output from the search unit 132 is connected to a muting switch 134 together with the output from the frequency unit 4 so that the transmitter 3 is muted when the receiver is searching the actual frequency of the transmitter 3, i.e. for the same course. If desired, however, the search unit 132 may be manually controlled by a control 135 so as to search a specific course. The output from the search unit 132 and receiver 11 is passed to a course indicator 136 and the output from this course indicator is passed, together with the output from the frequency unit 4, to a relative course indicator 137. As in Figure 1, the output from the receiver 11 is passed to a de-coder 138 which is similar to the course comparator 22 of Figure 1 and the output from the de-coder 138 is passed to a speed indicator 139 and from thence, together with the output from the coder 10, to a relative speed indicator 140. Finally, if the de-coder 138 indicates that the received transmissions emanate from a ship which has no receiver, the action warning indicator 19 is activated.

As in Figure 1, provision is made for code control and frequency control by the controls 141 and 142 respectively in order that the pilot may indicate his intention to change course or speed.

The transmitter 3 and receiver 11 are interconnected by a synchroniser and switch 17, 18.

Figure 10:
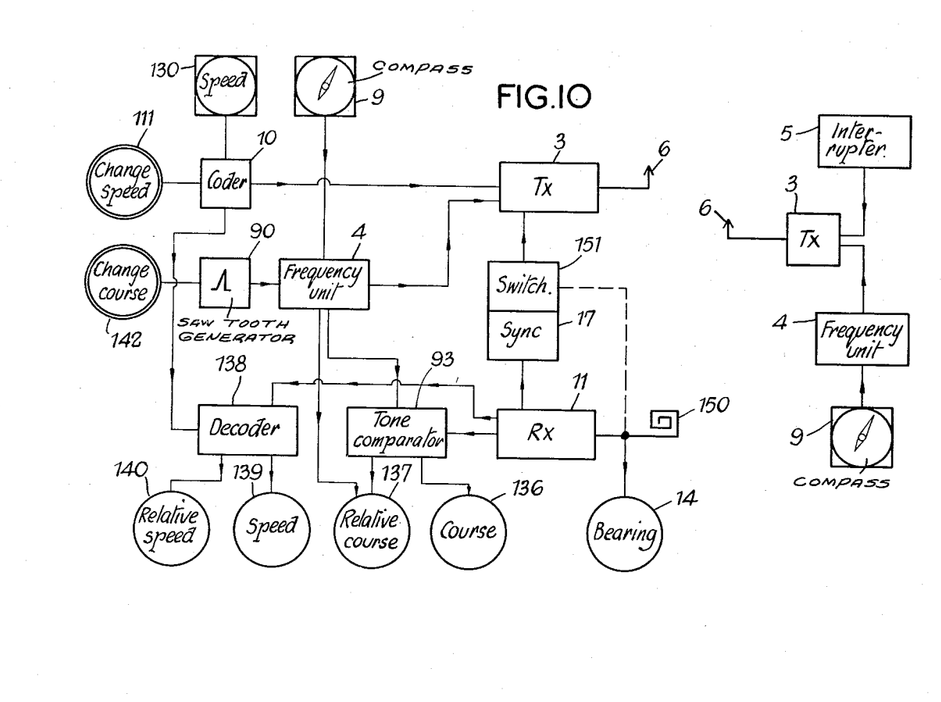
Figure 10 is a diagrammatic representation of an embodiment similar to Figure 6 but suitable for ships.

Figure 10 shows how the apparatus of Figure 6 is modified for a ship, and this apparatus comprises, in the minimum case, the transmitter 3 and aerial 6, the transmitter 3 being operated by an audio frequency unit 4 which is fed with information from the compass 9 so that in this case the audio note transmitted is characteristic of the course of the ship. In addition the transmitter is keyed by the interrupter 5.

In the full apparatus, the equipment is substantially the same as that described with reference to Figure 6 except that, as previously described, with reference to Figure 9, the course of the vessel is used to control the frequency unit 4. In this arrangement provision is made by means of the saw tooth generator 90 controlled by the manual control 142 to indicate that the pilot of the ship is intending to change course. In addition the speed sensitive unit 130 controls the coder 10 in order to code the radio frequency of the transmitter 3. The control 141 is used to control the coder 10 to indicate that the pilot is intending to change speed.

However, the receiving portion of the apparatus is slightly different in that the receiver 11 is provided with only one aerial, namely a scanning directional aerial 150 which is directly connected to the bearing meter 14 so as to show in what direction signals are received from. The scanning aerial 150 is also directly connected to a suppressor switch 151 which serves to mute the transmitter 3 to prevent the reception by the aerial 150 of transmissions from the associated transmitter, this switch 151 also being operated by the synchroniser 17. The signals from the radio receiver 12 are passed through the necessary filters to the tone comparator 93 together with the signals from the frequency unit 4 so as to provide course and relative course indications on the meters 136 and 137. The pulses from the radio receiver 11 are also passed to the de-coder 138 together with the pulses from the coder 10 so as to present speed and relative speed upon the meters 139 and 140.

Figure 11:
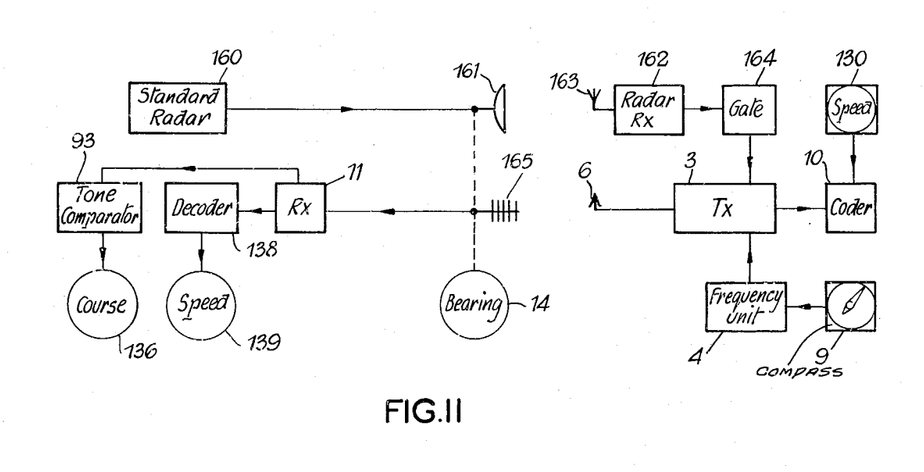
Figure 11 shows transponder equipment suitable for ships.

Figure 11 shows radar initiated responder apparatus particularly suitable for ships. Thus as shown in the left-hand portion of this figure, the ship is provided with a standard radar transmitter 160 having a rotating directional aerial 161, this equipment being a normal fitment and serving as the interrogator. As is known, the radar transmitter 160 emits a train of pulses, which are received after reflection and suitably displayed; the radar receiver, having no part in this invention, is not shown.

The transponder equipment, shown in the right-hand portion of the figure, includes a radar responder receiver 162 having an omni-directional aerial 163 and the output from the receiver 162 is used solely to control a gate 164 for the transmitter 3 which has signals fed to it from the speed sensitive unit 130, coder 10, compass 9 and frequency unit 4 as described with reference to Figures 9 and 10. Hence it will be seen that, since the transmitter 3 only operates when triggered, there is a saving in power and in addition unnecessary transmission is avoided.

The remainder of the interrogator comprises a directional aerial 165 coupled mechanically to the aerial 161 and also to the bearing meter 14. In addition there is the usual receiver 11 operating on the same frequency (desirably in the U.H.F. or V.H.F. bands) as the transmitter 3, de-coder 138, speed meter 139, tone comparator 93 and course indicator 136, all as described with reference to Figures 9 and 10. Clearly the aerial 165, by virtue of its directional properties will only receive reply transmissions intended for it, thereby making easier the separation between individual ships in the same area.

In order to limit the range of the device, a sensitivity control may be included in the gate 164, or one or more of the aerials may be arranged at a specific height above sea level to make use of the shielding effects of the sea.

Thus we have disclosed methods and apparatus for the exchange of data in a co-operative system and, more particularly, we have disclosed the methods and apparatus necessary for the exchange of the specific data that is required to prevent collisions between moving vessels. The information is presented to the pilot in such a form that he can determine the presence, position and movement of the other vessel and may, therefore, take the necessary action to prevent collisions. However, we believe that it is extremely important that the intepretation of the data which is exchanged should be made automatic and, therefore, in my co-pending application Serial No. 690,367 of even date herewith we have disclosed methods and apparatus whereby the information may be automatically translated into an indication of the necessary course of action to be taken to avoid the collision.

Although in this specification specific forms of apparatus have been disclosed, it should be appreciated that many changes in detail are possible and the description is, therefore, given by way of example only. The scope of the invention is defined in the claims.

I claim:

1. A co-operative method of exchanging data comprising the steps of generating a radio frequency carrier; modulating such carrier with a modulating frequency characteristic of a first data item; pulse modulating such modulating frequency by pulses of a length characteristic of a second data item and transmitting such pulsing modulated carrier in an interrupted manner, the interval between transmissions being independent of the length of a pulse transmitted during a transmission; and receiving, demodulating and decoding such transmission.

2. The method of claim 1, including the step of using a directional receiver to provide mutual bearing information.

3. The method of claim 1, in which the modulating frequency is a radio frequency and one side band is suppressed.

4. The method of claim 1, in which the carrier frequency is suppressed.

5. Apparatus for the co-operative exchange of data comprising radio frequency carrier generating means; means for generating a modulating frequency characteristic of a first data item; means for modulating such carrier frequency by said modulating frequency; means for interrupting said modulating frequency by pulses of a length characteristic of a second data item; a transmitter; means for passing such pulsing modulated carrier frequency to such transmitter; and means for interrupting the carrier frequency transmitted by such transmitter at a rate such that the rest periods are independent of the pulse length; and a receiver to demodulate the received signals; frequency sensitive means; means to pass the modulating frequency to such frequency sensitive means to determine the value of the modulating frequency; a pulse length determinator; and means to pass the received signals to such pulse length determinator to determine the pulse length of the received signals.

6. The apparatus of claim 5, in which the means for interrupting the modulating frequency and the means for interrupting the carrier frequency are identical, whereby a transmission period is equal in length to a pulse.

7. The apparatus of claim 5, in which said receiver has directional properties in order to determine the bearing of the radio frequency transmitter.

8. The apparatus of claim 5, in which a direction sensitive mechanism controls the frequency of said modulating frequency so as to be characteristic of the course of the vessel.

9. The apparatus of claim 5, in which the received modulating frequency and locally generated modulating frequency are both audio frequencies, and in which are provided two audio frequency meters each having an output, means feeding said respective frequencies to said respective meters, an indicator, and means feeding the respective outputs of said meters to said indicator in opposition to show relative first data items.

10. Apparatus for the co-operative exchange of data comprising radio frequency carrier generating means; means for generating a modulating radio frequency characteristic of a first data item; a first mixer for mixing said modulating frequency with the carrier frequency; means for suppressing the modulating frequency and the carrier frequency; means for interrupting the modulated carrier frequency to form pulses of a length characteristic of a second data item; a transmitter; means for passing such pulsed modulated carrier frequency to such transmitter; and a receiver to demodulate the received signals to derive a received modulating frequency; frequency sensitive means; means to pass the received modulating frequency to such frequency sensitive means to determine the value of the received modulating frequency; a pulse length determinator; and means to pass the received signals to such pulse length determinator to determine the pulse length of the received signals.

11. The apparatus of claim 10, in which means are provided for suppressing one side band.

12. The apparatus of claim 10, in which the receiver includes a mixer to mix the received modulating frequency with the locally generated modulating frequency thereby to obtain a frequency characteristic of the difference in the first data items.

13. The apparatus of claim 12, in which is provided means to compare said difference characteristic frequency with a controlled frequency to produce a beat frequency, and a frequency meter for said beat frequency.

14. The apparatus of claim 12, in which is provided a frequency sensitive bridge circuit to measure the difference characteristic frequency.

15. Apparatus for the co-operative exchange of data comprising radio frequency carrier generating means; means for generating a modulating frequency characteristic of a first data item; means for modulating said carrier frequency with said modulating frequency; means for suppressing said modulating frequency; a bistable switch; a transmitter; a connection from said switch to said transmitter; means passing such modulated carrier frequency to said transmitter; means operating said switch to cut off said transmitter after a period characteristic of a second data item; and a receiver for such transmissions; a connection from said switch to said receiver to activate same when said transmitter is switched off.

16. The apparatus of claim 15, in which is provided random frequency generating means to operate said switch to de-activate said receiver and start said transmitter.

17. The apparatus of claim 15, in which is provided with said receiver differentiator means to detect the end of a received transmission and means connecting such differentiator to said switch to de-activate said receiver and start said transmitter.

18. Apparatus for the co-operative exchange of data comprising a transmitter and a receiver and, associated with such transmitter, radio frequency carrier generating means; means for generating a modulating frequency characteristic of a first data item; means for modulating such carrier frequency with said modulating frequency; means for interrupting such modulated carrier frequency with pulses characteristic of a second data item; an interrogator transmitter and receiver; and time delay measuring means associated with such interrogator; and, associated with such receiver, means to demodulate the received signals; frequency sensitive means; means to pass such demodulated received signals to such frequency sensitive means to determine the value of the modulating frequency; means to determine the pulse length of the received signals; a responder receiver tuned to said interrogator transmitter; a responder transmitter tuned to said interrogator receiver; and a connection between said responder receiver and transmitter.

19. The apparatus of claim 18, in which time delay means are included between the responder receiver and transmitter, the time delay being inversely dependent upon the speed characteristic of the vessel.

20. The apparatus of claim 18, in which are provided, with said interrogator transmitter, means to generate control pulses characteristic of the first data item; between the responder receiver and transmitter, a gate operating on the received pulses, with said responder, means to generate local pulses characteristic of its own first data item; and means to operate said gate to prevent transmission from said responder transmitter unless the characteristics of the control and local pulses are sufficiently similar.

21. Apparatus for the co-operative exchange of data comprising a transmitter and a receiver and, associated with such transmitter, carrier generating means; modulating frequency generating means, such modulating frequency being characteristic of a first data item; modulating means to modulate said carrier by said modulating frequency; first and second pulse generators to effectively generate respective pulses of a length characteristic of a second data item and a length characteristic of a third data item; means to sequentially modulate the modulated carrier by said two pulses; and means to de-activate said transmitter at the end of said two pulses; and, associated with such receiver, frequency sensitive means to determine the value of said modulating frequency; and first and second time measuring means to determine the length of said first and second pulses.

22. The apparatus of claim 21, in which said first and second pulse generators comprise first and second value representors set to values corresponding to said second and third data items; unsetting means to return said value representors sequentially to a basic value at a known rate; a connection to start said unsetting means when said transmitter is started; a connection to suppress the modulation of said carrier when said first value representor has reached its basic value until the second value representor leaves the set value; and a connection to de-activate said transmitter when the second value representor reaches its basic value.

23. The apparatus of claim 22, in which each said value representor is a uni-selector device and said unsetting means is a train of control pulses to return the uni-selector device to zero.

24. Apparatus for the co-operative exchange of data comprising a transmitter and a receiver; with said transmitter, carrier generating means; modulating frequency generating means, such modulating frequency being characteristic of a first data item; a modulator to modulate said carrier by said modulating frequency; a pulse generator to generate a pulse of a length characteristic of a second data item; means to start said transmitter at the beginning of said pulse; means to stop said transmitter and to activate said receiver at the end of said pulse; and, with said receiver, frequency sensitive means to determine the value of said modulating frequency; and time measuring means to determine the length of time during which said transmitter is operative.

25. The apparatus of claim 24, in which said pulse generator comprises a value representor set to a value corresponding to the second data item; unsetting means to return said value representor to a basic value at a known rate; a connection to start said unsetting means when said transmitter is started; and a connection to stop said transmitter when said basic value is reached.

26. The apparatus of claim 25, in which said value representator is a uni-selector device and said unsetting means is a train of control pulses to return the uni-selector device to zero.

27. Apparatus for the co-operative exchange of data comprising a transmitter and a receiver: with said transmitter, carrier generating means; modulating frequency generating means; a modulator to modulate said carrier by said modulating frequency; a pulse generator, the length of each pulse being characteristic of a second data item; and means to pulse modulate the modulated carrier by said pulses; and with said receiver, a demodulator; frequency sensitive means associated with said demodulator; and a time measurer to determine the length of each pulse thereby to measure said second data item.

28. The apparatus of claim 27, in which said time measurer comprises a value representator; advancing means to set said value representator towards a final value at a known rate; a connection to start said advancing means when a pulse is received; and a connection to stop said advancing means at the end of a pulse, whereby the final value of said value representator represents the second data item.

29. The apparatus of claim 27, in which said value representator is a uni-selector device, and said advancing means is a train of control pulses advancing such uni-selector towards a final value.

30. A cooperative method of exchanging data comprising the steps of generating a radio frequency carrier wave; modulating such carrier wave with a modulating frequency characteristic of a first data item; pulse modulating such carrier wave with pulses of a length characteristic of a second data item and transmitting such pulsing modulating carrier wave, the interval between transmissions of such wave being independent of the length of a transmission; and receiving, demodulating and decoding such transmission.

31. The method of claim 30, in which the interval between transmissions is substantially equal to the pulse length of a transmission being received.

32. Apparatus for the co-operative exchange of data between two stations; comprising, at each station, means for generating a carrier at a frequency characteristic of a first data item, said first data item being selected from height and course; a transmitter for radiating such carrier; means for pulse modulating said carrier with pulses of a length characteristic of a second data item, said second data item being different from said first data item and being selected from course and speed; means for initiating said pulses at random intervals; a receiver for receiving signals in the form of said pulse modulated carrier and for selecting said signals according to their carrier frequency; means for determining the direction of origin of such selected signals; means with said receiver for determining the first data item from said received carrier frequency; means for determining said second data item from the pulse length of the received signals; means for suppressing said random initiation of pulses when said signals are selected; and means for initiating said pulses on the termination of a pulse of a selected received signal.

33. Apparatus for the co-operative exchange of data between two aircraft for the avoidance of collisions of such aircraft and comprising in each aircraft a transmitter and a receiver: in said transmitter, means for generating a radio frequency carrier; means for generating a sub-carrier at a frequency determined by the height of the aircraft carrying said transmitter; means for impressing said sub-carrier upon said carrier; means for generating pulses in said carrier, said pulses being of a length characteristic of the course of the aircraft carrying the transmitter; and means for initiating generation of said pulses at random intervals: and in said receiver, means to receive transmitted signals; means to determine the sub-carrier frequency of received signals and to determine whether there is near identity between the sub-carriers of received and transmitted signals, thereby to form selected signals; means to determine the direction of reception of said selected signals; means to determine the pulse length of a selected signal; means controlled by said selected signals for suppressing the random initiation of pulses in said transmitter; and means for initiating the transmission of a pulse from said transmitter immediately following the end of a pulse in said selected signals received by said receiver.

34. The apparatus of claim 33 in which said pulses are double pulses separated by a short interval; such double pulses being characteristic of the course and speed of the aircraft carrying the transmitter and in which the end of the first pulse in said double pulses is rendered ineffective to initiate a transmission of a pulse.

References Cited in the file of this patent

UNITED STATES PATENTS

| | | |
|---|---|---|
| 2,568,568 | Stansbury | Sept. 18, 1951 |
| 2,585,605 | Wallace | Feb. 12, 1952 |
| 2,606,317 | Wallace | Aug. 5, 1952 |
| 2,724,831 | Wallace | Nov. 22, 1955 |